May 23, 1939.  C. B. MOORE  2,159,877
MEASURING AND CONTROL APPARATUS
Filed June 1, 1936   3 Sheets—Sheet 2
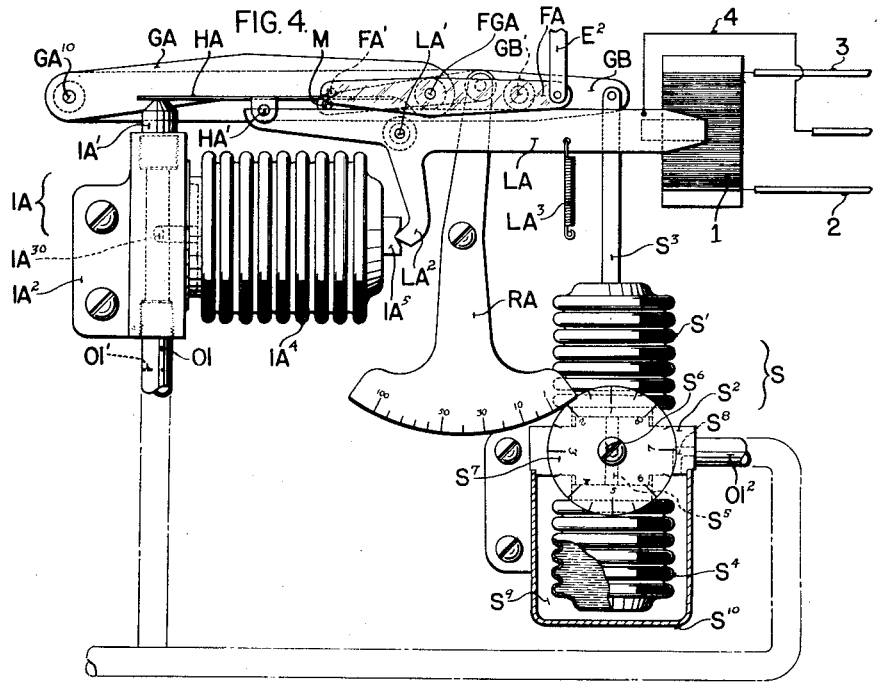
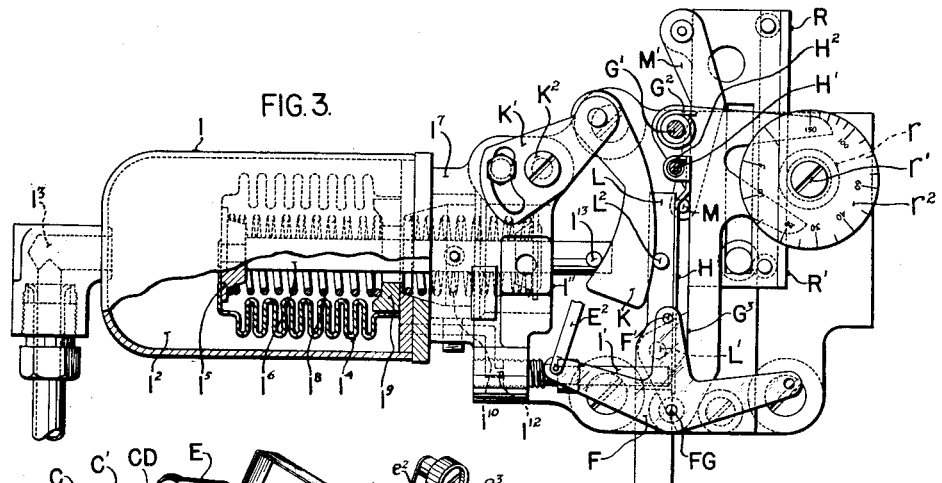
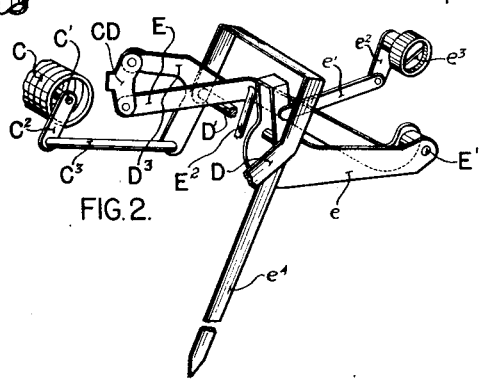
INVENTOR.
COLEMAN B. MOORE
BY George M. Musselman
ATTORNEY May 23, 1939.  C. B. MOORE  2,159,877
MEASURING AND CONTROL APPARATUS
Filed June 1, 1936 3 Sheets-Sheet 3
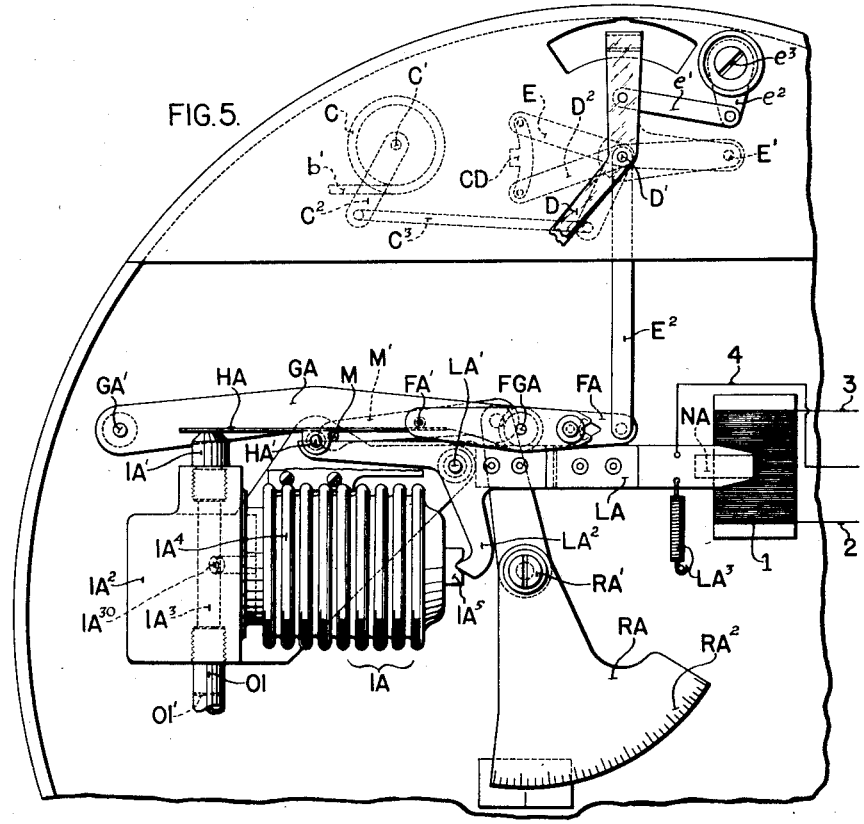
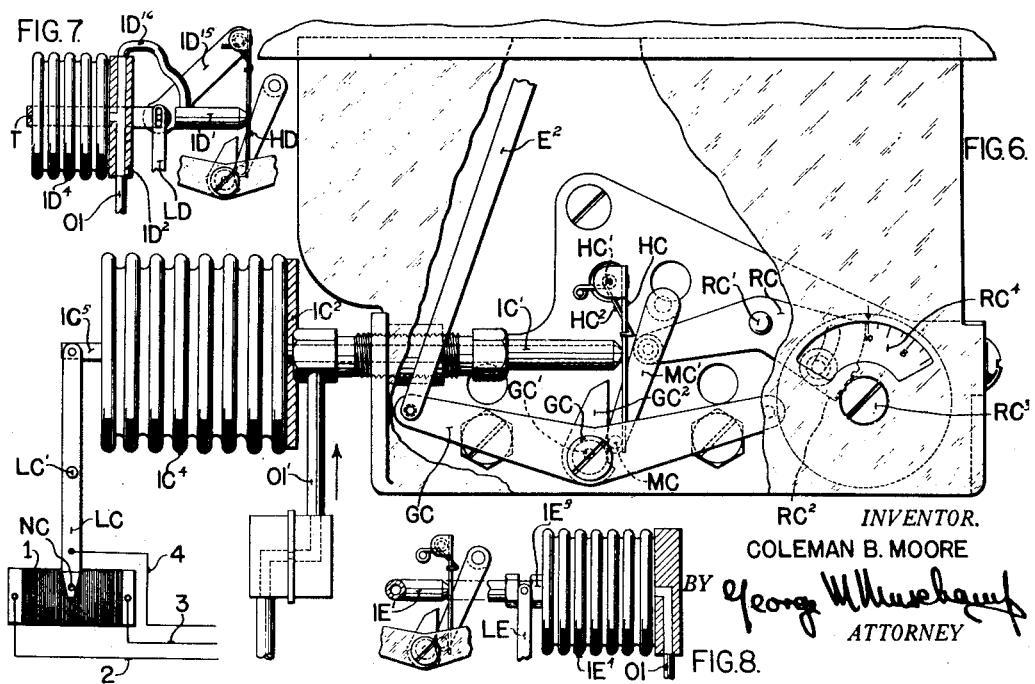
INVENTOR.
COLEMAN B. MOORE
BY
ATTORNEY Patented May 23, 1939

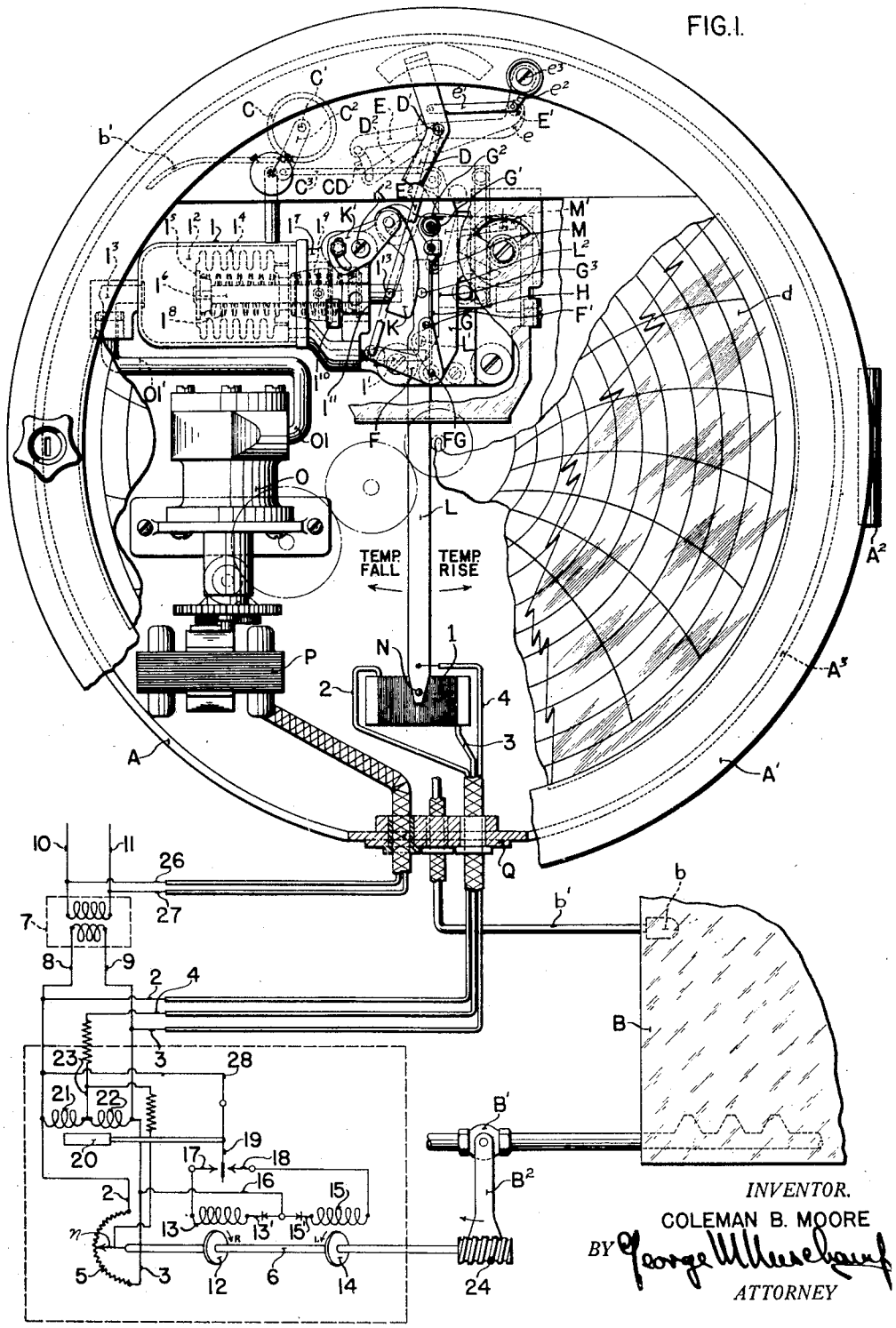

2,159,877

UNITED STATES PATENT OFFICE 2,159,877

MEASURING AND CONTROL APPARATUS

Coleman B. Moore, Carroll Park, Pa., assignor to The Brown Instrument Company, Philadelphia, Pa., a corporation of Pennsylvania Application June 1, 1936, Serial No. 82,851

17 Claims. (Cl. 236—82)

The general object of the present invention is to provide improvements in control instruments of the type including a measuring element deflecting in accordance with a measurable control quantity, and a relay mechanism or power device through which the deflection of said measuring element effects adjustments of a control switch or analogous control device which are not practically obtainable by direct action of the deflecting element on the control device. More specifically, the object of the present invention is to provide an instrument of the type mentioned, with pneumatic relay provisions of novel construction, adapted to give a relatively wide range of adjustment to the control device, and to establish a relation between the movements of the deflecting element and control device, which is desirable in respect both to the magnitude and timing of said movements.

My improved instrument is adapted for a wide range of uses. Its deflecting element may respond to, and by its deflections furnish a measure of, changes in pressure, temperature, electromotive force, or any other physical condition, which, by its changes gives rise to variations in a measureable force, desirably resulting in control actions selectively dependent on such variations.

In preferred forms of embodiment of the invention hereinafter described by way of illustration, the air under pressure used in the relay portion of the instrument mechanism, is compressed by a small compressor located within the instrument casing and driven by an electric motor, also located in the casing, and also serving to drive a chart on which a record of the deflections of the measuring member is made, and the relay provisions and adjustable control element, are of such character and so disposed as to permit the assemblage of all of the mechanism referred to, in an instrument casing of the type and size customarily used in ordinary measuring and control instruments including instruments having no provisions for the purposes herein mentioned.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a view including an elevation of a control instrument with parts broken away, and including a diagrammatic representation of furnace control provisions external to the instrument and cooperating with the latter to maintain predetermined furnace temperature conditions;

Fig. 2 is a perspective view of a portion of the apparatus shown in Fig. 1;

Fig. 3 is an elevation on a larger scale than Fig. 1, of parts of the mechanism shown in that figure;

Fig. 4 is an elevation of a modified form of a portion of the apparatus shown in Figs. 1, 2, and 3;

Fig. 5 is a view illustrating another modification of the apparatus shown in Figs. 1, 2, and 3;

Fig. 6 is an elevation of portions of a fourth form of instrument; and

Figs. 7 and 8 are elevations partly in section, illustrating different modifications of the instrument form shown in Fig. 6.

In the embodiment of the invention shown in Figs. 1, 2, and 3, my improved control instrument comprises mechanism located in an instrument casing A, which may be of conventional instrument casing size and form, and includes a front door A', with a hinge connection $A^2$ between the door and casing body, said instrument being employed to adjust the fluid fuel supply valve B' of a furnace or heater B, as required to maintain a predetermined furnace temperature to which the device $b$ is responsive. As shown, the device $b$ is the bulb of a fluid pressure thermometer, the pressure in which is transmitted by a tube $b'$ to the stationary end of a Bourdon tube helix C forming a part of the instrument mechanism. The free end of the helix C gives angular movements about a shaft C', coaxial with the helix, to a crank arm $C^2$, as the thermometer pressure increases and decreases. The angular movements of the arm $C^2$ oscillate a pen arm D about its stationary pivotal support D', and oscillate a lever E about its pivotal support E', and thereby give longitudinal adjustment movements to a flapper valve adjusting link $E^2$. The latter connects the lever E to a floating lever F, which is pivotally connected at FG to a supporting lever G, the latter being pivotally supported at G'.

The lever F through a pin projection F' engages a flapper valve H pivoted at H' and biased by a spring $H^2$ for movement in the direction to engage, and close the discharge through the vent, or bleeder outlet, nozzle I' from the pressure chamber I² of a fluid pressure relay or power device I. The chamber I² receives air under pressure through an inlet I³, and has a movable wall formed by a bellows I⁴. A plunger or stem I⁶ axially disposed in the bellows I⁴ and operatively connected to the closed movable end I⁵ of the latter, operates, as the bellows I⁴ expands and contracts, through a thrust member K on a lever L, pivoted at L', to move the lever L clockwise or counter-clockwise as the pressure in the chamber I² increases and decreases, respectively. The clockwise and counter-clockwise adjustments of the lever L effect counterclockwise and clockwise adjustments, respectively, of the previously mentioned lever G through a thrust transmitting element M. The lever L carries the instrument control switch or contact N.

In the preferred instrument form shown, the compressed air used in the operation of the device A, is compressed by a small compressor O located in the instrument casing and having its delivery pipe OI connected to the inlet I³ of the device I. The delivery pipe OI is formed with an orifice OI' suitably restricted to facilitate the regulation of the pressure in the chamber I² by adjustment of the valve H. With the compressor O within the instrument casing, the air drawn into the compressor may come from the air space within the casing, to which the air is returned through the nozzle I'. As shown, the compressor O is driven by an instrument motor P, shown as a small electric motor employed in the usual way, to give motion to the record disc d on which a record of the furnace temperature is traced by the pen arm D.

When the furnace temperature to which the bulb b is responsive, rises above its normal value, determined by the adjustment of the control instrument, the pen arm D and lever E are given clockwise adjustments. The clockwise adjustment of the lever E through the link E², gives a clockwise adjustment to the lever F, thereby moving the flapper valve H away from the nozzle I' and reducing the pressure in the chamber I². The resultant elongation of the bellows I⁴ permits a clockwise adjustment of the lever G which results in a bodily movement of the lever F, permitting a movement of the valve H toward the nozzle I', partially neutralizing the first mentioned adjustment in the opening direction of the valve H. Operations which are the converse of those described, occur when the furnace temperature falls below its normal value. The ultimate effect of the adjustments given the valve H, is to maintain a pressure in the chamber I², which increases and decreases as the temperature of the bulb b increases and decreases, and thereby makes the angular position of the lever L dependent in a predetermined manner on the furnace temperature.

The lever L carries a control switch or contact N, through which the angular adjustments of the lever L control the adjustment of the heater supply valve B' and gives the latter adjustment movements proportional to the adjustment movements of the lever L. The proportioning means comprise a portion forming a part of the control instrument and located within the instrument casing A, and a larger portion external to the casing A and connected to the instrument portion only by electrical conductors extending through the instrument casing wall. The portion of the proportioning means within the instrument casing comprises an electrical resistance 1, ordinarily, and as shown, wound into a helical coil on a supporting body of insulating material, and so disposed that as the contact N moves through its range of oscillation, it will engage the resistance conductor 1 at successively different points along its length, the particular point engaged at any time being dependent on the angular position of lever L and contact N at the time. Conductors 2 and 3 are connected to the ends of the resistance conductor 1, and a resistance 4 is connected to the switch or contact N. The conductors 2, 3, and 4, are conveniently included in a single cable extending through a part Q mounted in an opening in the instrument casing body, such as is customarily employed in instruments having casing enclosed parts electrically connected to external apparatus.

Externally of the instrument casing, the conductors 2 and 3 are connected to the ends of a resistance 5 curved in a circle about the axis of a rotatable shaft 6 carrying a contact or switch arm n engaging the resistance 5 at different points along the length of the latter as the angular position of the shaft 6 is adjusted. The resistances 1 and 5, conductors 2, 3, and 4, and contacts N and n, form parts of a Wheatstone bridge arrangement which is energized by a transformer 7, the terminals of the secondary winding of that transformer being connected by conductors 8 and 9 to the conductors 2 and 3, respectively. The terminals of the primary winding of the transformer 7 are connected to alternating current supply conductors 10 and 11, which may form a part of any available alternating current supply system of customary commercial voltage for lighting and power purposes.

As diagrammatically shown, the shaft 6 is the armature shaft of a reversing motor including a rotor 12 and cooperating winding 13, and a second rotor 14 and cooperating winding 15, the shaft 6 being rotated in one direction when the winding 13 is energized, and in the opposite direction when the winding 15 is energized, as hereinafter described. One terminal of the winding 13 is connected through a limit switch 13' and a conductor 16 to the bridge conductor 3, to which one terminal of the winding 15 is also connected through the conductor 16 and a limit switch 15'. The second terminal of the winding 13 is connected to a switch contact 17, and the second terminal of the winding 15 is connected to a switch contact 18. A pivoted switch member 19, connected by a conductor 28 to the bridge conductor 2, is movable between one end position in which it engages the contact 17, and thereby connects the winding 13 between the bridge conductors 2 and 3, and a second end position in which it engages the contact 18 and thereby connects the winding 15 between the bridge conductors 2 and 3.

The switch 19 forms part of a proportioning relay, comprising an armature 20 connected to the switch 19, so as to oscillate the latter when the armature 20 is given longitudinal reciprocating movements. It is given such movements by changes in the relative values of the currents flowing in the coils 21 and 22, which are arranged end to end and in inductive relation with the armature 20. The coils 21 and 22 are connected in series with one another between the conductors 2 and 3, and their adjacent terminals are connected by a conductor 23 to the bridge conductor 4.

In any condition of stable operation, the currents flowing through the relay coils 21 and 22 will be equal, and the armature 20 and the switch 19 will each be in its neutral position. Any deflection of the lever L and contact N will make the currents flowing through the coils 21 and 22, unequal and will result in an operation of the reversing motor which will adjust the contact $n$ as required to rebalance those currents. For example, on a deflection of the contact N in the clockwise direction, corresponding to a decrease in the temperature of the bulb $b$ below its normal value, the current flowing through the relay coil 22 will be increased relative to the current flow through the coil 21. In consequence, the armature 20 will be shifted to the right, bringing the pivoted switch 19 into engagement with the contact 18, and thereby energizing the motor winding 15. The rotor 14 will then rotate the shaft 6 in the counter-clockwise direction until the resultant movement of the contact $n$ makes the sum of the portion of the resistance 5 between the contact $n$ and conductor 3 and in the portion of the resistance 1 between the contact N and the conductor 2, equal to the sum of the other portions of the resistances 1 and 5, whereupon the currents flowing through the relay coils 21 and 22 will be again equalized, and the armature 20 will be returned to its mid position. Any adjustment of the contact N in either direction, thus produces a corresponding proportional adjustment of the contact $n$ in one direction or the other.

The switches 13' and 15' are actuated by the rotation of the shaft 6 to perform the usual limit switch function of preventing over-travel of the armature shaft in either direction which would carry the contact $n$ beyond the corresponding end of the resistance 5. As such motor limit switches are in common use, there is no occasion to illustrate or describe the connections through which the switches 13' and 15' are actuated by the shaft 6. As diagrammatically shown, the shaft 6 carries a worm 24 engaging the teeth of the worm gear segment $B^2$ mounted on the operating shaft of the fuel valve B' so that the latter is angularly adjusted in the opening or closing direction, as the lever L deflects clockwise or counter-clockwise, respectively, from its neutral position.

As shown, branch conductors 26 and 27 from the supply conductors 10 and 11, form the energizing conductors for the motor P and are included in a cable passing through the part Q. The latter is also formed with a passage for the tube $b'$ connecting the thermometer bulb to the helix C.

While the essential ultimate elements of the apparatus shown in Fig. 1 have now been described, the control instrument includes various practically necessary or desirable construction and adjustment features not previously mentioned. To vary the normal temperature of the bulb $b$ which the apparatus tends to maintain, means are provided for adjusting the fulcrum pivot E' for the lever E. As shown, that pivot is carried by a bell crank lever $e$ angularly adjustable about the pen axis D', and adapted to be so adjusted by a link $e'$ connecting the lever $e$ to a crank arm $e^2$. The latter is carried by a rock shaft journaled in the instrument structure adjacent its periphery, and adapted for angular adjustment by a screw driver engaging a kerf $e^3$ in the front end of the shaft. The mounting of the shaft is such that it is frictionally held in any position into which it is adjusted. The opposite end of the lever E is connected by a link CD to a crank arm $D^3$ connected to the pen arm D. Angular adjustment of the lever $e$ will not disturb the position of the pen arm D, but will give a longitudinal adjustment to the link $E^2$ and thereby effect an angular adjustment of the flapper valve operating lever F about its pivot FG, with the result of changing the angular position of the lever L assumed for any particular position of the pen arm D. An indicating arm $e^4$ may be secured to the lever E for the purpose of indicating on the record chart A, the normal temperature which the apparatus is adjusted to maintain.

The device I comprises a spring $I^8$ acting between the movable bellows end wall $I^5$, and a portion $I^9$ of the end member or head $I^7$ of the device I, to resiliently oppose the contraction of the bellows, and a spring $I^{10}$ acting between said end portion $I^9$, and a collar $I^{11}$ secured to the outer end portion of the plunger $I^6$ which opposes the expansion of the bellows. The resiliency of the bellows wall of the latter also constitutes a spring force tending to regulate the length of the bellows. Another force having some length controlling effect on the bellows, is due to the bias spring action on the levers G and L. As shown, that action is wholly due to the spring $G^2$ acting directly on the lever G. When necessary, however, a supplemental bias spring may act directly on the lever L in the manner in which the hereinafter mentioned spring $LA^3$ acts on the lever LA of Fig. 5, to the end of insuring that the lever L will turn counter-clockwise whenever permitted so to do by the plunger $I^6$, notwithstanding frictional resistance to the sliding movement of the contact N above the resistance 1. As shown, the nozzle F is carried by the end head $I^7$ and communicates with the chamber $I^2$ through a passage $I^{12}$ in said head.

With the construction described, the pressure in the chamber $I^2$ necessary to maintain any particular length of the bellows $I^4$, must be equal and opposite in direction to the resultant of the forces acting on the bellows and tending to elongate the latter. Those forces include the pressure of the atmosphere acting internally on the bellows, and the various above mentioned spring forces.

With no other adjustment of the apparatus, the position of the bellows end wall $I^5$, and the pressure in the chamber $I^2$ required to hold the lever L in its neutral position, may be varied by adjustment of the thrust member K through which the plunger $I^6$ acts on the lever L. As shown, the member K is interposed between pin projections $I^{13}$ and $L^2$ from the plunger $I^6$ and lever L, respectively. The member K is in the form of a curved wedge pivotally connected at one end to a supporting arm K'. The latter is detachably clamped to the end head $I^7$ for angular adjustment about a clamping screw $K^2$. By such angular adjustment of the arm $K^2$, the member K may be longitudinally adjusted to thereby vary the distance between the plunger and lever projections $I^{13}$ and $L^2$.

In the instrument shown in Fig. 1, the member M is a pin carried by an arm or link M' and is adjustable to engage the lever G at different points along the length of an edge $G^3$ of the lever, which is substantially radial to the pivot FG. The adjustment of the part M along the edge $G^3$ varies the ratio between the angular movement of the lever L and the resultant angular movement of the lever G. The adjustment of the part M along the edge G³ is effected by moving a support R which is mounted for longitudinal movement in the instrument framework, and to which the link or arm M' is pivotally connected. The member R is provided with a longitudinally extending rack bar portion R', the teeth of which are engaged by spur gear teeth of a rotatable part $r$ journalled in the instrument framework. The part $r$ is formed as shown, with a kerf $r'$ at the front end of its supporting shaft, which may be engaged by a screw driver through which the member $r$ may be rotated to thereby longitudinally adjust the support R. As shown, the part $r$ is formed with a dial scale $r^2$ for indicating the angular position of the part $r$, and thereby the leverage with which the lever L acts on the lever G in any existing adjustment or calibration of the instrument.

The instrument adjustment effected by varying the leverage with which the lever L acts on the lever G, is of much practical importance, as it determines what may be called the instrument control range; i. e. the extent of variation in the value of the quantity measured, required to effect a given angular adjustment of the lever L and contact N, and the corresponding variation in the throttling effect of the fuel valve B'. The immediate effect of adjusting the member M toward or away from the pivot FG is to decrease or increase respectively, the extent to which an initial adjustment of the flapper valve H produced by longitudinal movement of the link E², is partially neutralized, or cancelled out by the resultant change in bellows pressure and movements of the plunger I⁶. The extent to which each initial adjustment of the valve H is neutralized by the resultant movement of the plunger I⁶, determines the ratio of the deflection of the pen arm to the deflection of the lever L.

With the part M remote from the pivot FG as shown in Fig. 1, a variation in the controlling quantity more than that corresponding to full scale deflection of the pen arm D, is required to produce a deflection of the lever L corresponding to movement of the contact N from one end to the other of the resistance $l$. With the part M close to the pivot FG, less than full scale deflection of the pen arm D will produce the deflection of the lever L required for movement of the contact N from one end to the other of the resistance $l$. In a certain intermediate adjustment of the part M, full scale deflection of the pen arm D may be just sufficient to effect movement of the contact N from one end to the other of the resistance $l$.

What instrument control range adjustment will give the best control results in furnace regulation or in the regulation of practically any industrial process or operation, will depend upon various factors, as those skilled in the control art will understand, and in particular, will depend upon the extent and rapidity of load changes tending to changes in the quantity measured, and on the rate of response to control changes. For example, in one installation, the total normal variation in furnace load or heat requirement, may be between a minimum and a maximum 50% larger than the minimum, while in another installation, the normal and to be expected maximum heat requirement may be several hundred per cent of the minimum heat requirement. A given change in the rate of fuel supply may produce a significant effect on the controlling temperature in five minutes in one installation, and in twenty minutes in another installation. As a result of such variations in operating conditions, proper regulation, and the avoidance of an objectionable hunting tendency, may require that on a given change of load, the controlling temperature should be permitted to depart much more widely from the desired normal temperature in one installation than in another installation.

In general, the control range or adjustment of the lever L and contact N may advantageously be greater for a given variation from normal of the controlling temperature, when conditions permit variations in that temperature to be kept relatively small, than when conditions require that the maximum permitted controlling temperature variation should be relatively large. The wide variation in control range effected by adjustment of the member M in the instrument shown in Fig. 1, permits the instrument to be adjusted or calibrated to have the control range giving the best regulating results in installations having very different control requirements. For most uses of such apparatus as is shown in Fig. 1, there will be a certain normal or average load requirement, and ordinarily the best results are obtainable in such case, with the parts adjusted so that in stable operation with the normal load, the lever L will be in or near its mid position. To that end, the contact $n$ and the spindle of the control valve B may well be relatively adjustable, as by angular adjustment of the contact $n$ relative to the reversing motor shaft 6, so that when the contact $n$ is in its mid position, the flow capacity of the fuel valve B will be that required to supply heat at the normal furnace load rate. In general, changes in operating conditions making desirable any significant change in adjustment of the part M, will also make desirable adjustment of the contact $n$ relative to the shaft 6, and adjustment of the thrust member K to vary the distance between the projections I¹³ and L².

In Fig. 5 I have illustrated a modification of a portion of the instrument mechanism shown in Fig. 1, contributing to instrument simplification without significant change in the operating characteristics of the instrument. The modification shown in Fig. 5 includes some parts which are exactly like corresponding parts of Fig. 1, and are designated by the same reference symbols in both figures. Each of a number of reference letters used in Figs. 1, 2, and 3, has "A" added to it in Fig. 5, to designate a part shown in that figure which corresponds generally, but is somewhat different from the part designated in Figs. 1, 2, and 3 by the reference letter used without the "A". The fluid pressure device IA of Fig. 5 comprises a bellows IA⁴ externally exposed to the pressure of the atmosphere and subjected internally to a control fluid pressure determined by the adjustment of the flapper valve HA relative to the bleeder or vent nozzle IA'. The latter is carried by a stationary portion IA² of the device IA forming the support for the bellows IA⁴, to which the stationary end of the latter is secured. The part IA² is formed with a passage IA³ connecting the nozzle passage to the compressor delivery pipe OI. A passage IA³⁰ connects the passage IA³ to the interior of the bellows IA⁴. The movable end IA⁵ of the bellows of Fig. 5, engages a lateral arm extension LA² of the lever LA. The latter is pivoted to the instrument supporting framework at LA' and includes a sliding contact NA engaging the resistance $l$.

In Fig. 5, the lever GA pivoted at GA', is horizontally disposed, and is gravitationally biased for movement of its pivotal connection FGA with the valve lever FA, so that the projection FA' of the latter moves the flapper valve HA away from the nozzle IA'. The flapper valve HA is pivotally supported on the instrument framework at HA'. While in the apparatus of Fig. 5 the axes of pivots LA' and FGA are displaced, it will be clear that those axes would be more properly disposed in alignment, but the arrangement shown is sufficiently accurate for all practical purposes and as shown the device makes for mechanical simplicity.

The lever LA is positively biased by a spring $LA^3$ for movement in the clockwise direction when the contraction of the bellows $IA^4$ permits. In Fig. 5, the thrust transmitting member M is adjustable in the general direction of the lengths of the levers GA and LA, to vary the leverage with which lever LA acts on lever GA, by means of an angularly adjustable arm RA pivoted at RA', to which the arm M' carrying the member M, is pivotally connected. The arm RA is formed with a segment bearing a scale $RA^2$ to indicate the angular adjustment of the member RA and thereby the leverage with which the lever LA acts on the lever GA and hence the control range of the instrument.

As will be apparent without further explanation, the operation of the apparatus shown in Fig. 5 is essentially the same as that of the apparatus shown in Fig. 1.

With the control system illustrated in Fig. 1, whether the control instrument employed is of the form shown in that figure, or is of the modified form shown in Fig. 5, the assumed normal value of the controlling furnace temperature can be maintained only with a certain normal furnace load or heat requirement. With the furnace load above or below the normal value, the controlling temperature which the apparatus tends to maintain, will necessarily be below or above the assumed normal value.

Thus, for example, if following a period of stable operation in which the normal furnace load and controlling temperature values are maintained, the furnace load or heat requirement decreases, the furnace temperature to which the bulb b responds, will increase. That furnace temperature increase will result in a clockwise deflection of the pen arm D and some elevation of the link $E^2$ and a corresponding opening adjustment of the flapper valve H or HA. Such opening adjustment will decrease the pressure in the bellows, which will contract and give a clockwise adjustment to the lever L or LA, and thereby adjust the fuel valve B' to diminish the fuel supply to the furnace. The adjustment thus given the lever L or LA will, through its action on the lever G or GA, give a return or closing adjustment to the flapper valve.

Such return or closing adjustment, however, can not return the flapper valve to its normal load condition, with the instrument forms shown in Figs. 1 and 5, so long as the furnace load or heat requirement remains at its reduced value, since a new adjustment of the fuel valve must be maintained in order that fuel be supplied to the furnace at the reduced rate required to prevent a further increase in furnace temperature. Conversely, when the furnace heat requirement increases above the normal value, the controlling temperature must be maintained below its normal value, or the position of the lever L or LA will not be that required to maintain the fuel valve in the adjustment required to supply fuel to the furnace in accordance with its increased heat requirement.

The extent to which the control temperature maintained, must depart from the assumed normal temperature, as the load varies from its normal value, may be varied by the instrument adjustment or calibration effected by adjustment of the thrust member M. When that member is adjusted to decrease the leverage with which the level L or LA acts on the lever G or GA, respectively, the effect of a given change in the controlling pressure on the position of the lever L or LA, and consequently, on the furnace fuel valve adjustment, is increased, with the result of diminishing the extent of departure from the normal temperature, required for the maintenance of the last mentioned lever in position for the supply of fuel at the new rate required by a change in the furnace load from its normal or average value.

As those skilled in the control art will understand, however, the extent to which the ratio of movement of the lever L or LA to movement of the pen arm and link $E^2$ can be increased, is limited practically, by the fact that an increase in that ratio, if carried too far, will inevitably result in an objectionable hunting tendency. It is possible, however, by the use of suitable compensating provisions, one form of which is shown in Fig. 4, to automatically adjust the instrument on changes in load requirements, to make the departure of the controlling temperature resulting from a change in the furnace heat requirement, so small as to be without practical significance, without any increase in hunting tendency.

The instrument arrangement illustrated in Fig. 4, differs from that shown in Fig. 5, only as the result of the addition of compensating provisions, which comprise a level GB. The latter is pivotally connected to the instrument framework at GB', and forms an adjustable fulcrum support for the lever GA, which is pivoted at $GA^{10}$ to the lever GB. The lever GB is angularly adjusted by the elongation and contraction of a bellows S' forming part of a compensating device S, which also includes a second bellows $S^4$, and a stationary support $S^2$; to which one end of each bellows is attached. The movable end of the bellows S' has a stem extension $S^3$ pivotally connected to the lever GB. The interiors of the two bellows S' and $S^4$ are in communication through a passage $S^5$, which is formed in the part $S^2$, and may be variably restricted by rotation of a needle valve $S^6$. The latter is threaded into the body $S^2$ and carries a disc $S^7$ with scale markings thereon to indicate the throttling adjustment of the valve $S^6$. The bellows S' and $S^4$ are filled with a suitable incompressible liquid, as oil, so that the bellows S' will contract and elongate as the bellows $S^4$ elongates and contracts, respectively. The bellows S' is externally subject to the pressure of the atmosphere, while the bellows $S^4$ is subjected externally to the control pressure in the bellows $IA^4$, transmitted by a pressure supply pipe branch $OI^2$ and port $S^8$ in the support $S^2$ to the space $S^9$ which surrounds the bellows $S^4$ and is enclosed by a casing element $S^{10}$ attached to the support $S^2$.

With the arrangement shown in Fig. 4, the initial effect of a decrease in the furnace heat requirement and resultant increase in the furnace temperature, is an initial opening adjustment of the flapper valve, quickly cancelled out in part as the bellows $IA^4$ contracts, just as occurs with the apparatus shown in Fig. 5. With the arrangement of Fig. 4, however, the reduction of the control pressure in the bellows IA$^4$ which results in the contraction of the latter, is transmitted to the space S$^9$. The pressure reduction in that space results in an elongation of the bellows S$^4$ and a corresponding contraction of the bellows S' at a rate fixed by the adjustment of the throttling valve S$^6$. That rate, with any normal adjustment of the apparatus, is so relatively slow that it has no modifying effect on the initial opening and subsequent partial return adjustments of the flapper valves, but as the bellows S' slowly contracts the lever GB is given a clockwise adjustment about its fulcrum GB'. That adjustment, by raising the fulcrum GA$^{10}$ for the lever GA, results in a third slowly effected adjustment of the flapper valve HA, in the same direction as the original flapper adjustment.

The rise of fulcrum GA$^{10}$, as will be understood results in a clockwise turning movement of the lever GA about pin M thereby lowering pivot FGA and tending turning pin FA' of lever FA downward. If the point of pivotal connection between link E$^2$ and lever FA is stationary at the time as it will be when the temperature is stationary, the resultant clockwise movement of flapper HA will cause a slow decrease in pressure in bellows IA$^4$. With a continued change in temperature, however, and consequent movement of link E$^2$ the lever FA will be positioned jointly by lever GA and link E$^2$. For example, a return of the temperature to normal, whereby link E$^2$ is lowered, at a rate such that the resulting clockwise turning tendency of lever FA is suitably proportioned to the concurrent counterclockwise turning tendency of lever FA, under the action of lever GA, will result in no movement of flapper pin FA'. By said third adjustment, the flapper valve is slowly returned approximately to its normal temperature position, without disturbance or adjustment of the lever LA. In consequence, at the end of the period required for the operation of the compensating provisions, the controlling temperature will be returned approximately to its normal value, while the fuel valve will continue in the adjustment required to supply heat to the furnace at the rate needed for the maintenance of the normal temperature. An increase in the furnace load above its normal value, results in three successive adjustments of the flapper valve, which are the converse of those just described as resulting from a decrease in the furnace load, with the result of attaining a stable operating condition in which the control temperature is approximately at its normal value, and in which the fuel valve adjustment is that required to supply heat at the increased rate required to carry the increased furnace load.

As will be apparent, the change in length of each of the bellows of the device S, which is produced by a given change in the control pressure in the space S$^9$, will depend on the resultant of the atmospheric pressure on the bellows S', and the net spring force acting to elongate and shorten the bellows S$^4$ when the pressure in the space S$^9$ is reduced and increased, respectively. That spring force may be wholly due to the resiliency of the walls of the two bellows, or may be due in part to such resiliency and in part to a separate spring or springs exerting length changing forces on one or both of the two bellows.

In Fig. 6, I have illustrated an embodiment of my invention in an instrument which is simpler in construction and operation than the instruments previously described, and is adapted to give control results, which while not fully equivalent to those obtainable with the instruments previously described, are adequate and satisfactory for some control purposes. The arrangement shown in Fig. 6, includes no equivalent for the floating lever F or FA previously described, but has its link E$^2$ directly connected to a lever GC pivoted on a pivot pin GC' carried by the instrument framework and normally stationary, though preferably adapted for adjustment, as hereinafter described. The lever GC has an arm GC$^2$ which acts on the flapper HC through a thrust member MC. The flapper valve HC of Fig. 6 is pivoted to turn about a stationary pivot HC', and is biased for movement toward the cooperating nozzle IC' by a bias spring HC'. The member MC is carried by a supporting arm MC' pivoted to an adjusting arm RC. The latter is pivoted at RC' and includes a gear segment RC$^2$, the teeth of which are in mesh with the teeth of a spur gear portion of an angularly adjustable adjusting element RC$^3$. The latter includes a dial RC$^4$, with a scale marking thereon, for exhibiting the adjustment of the thrust member MC and the resultant leverage with which the arm GC$^2$ acts on the flapper valve HC. The nozzle IC' is secured in fixed relation with the stationary head or end IC$^2$ of a relay bellows IC$^4$ externally exposed to the pressure of the atmosphere. The movable end of the bellows is connected by a part IC$^5$ to the end of the control lever LC pivoted at LC' and carrying a contact NC sliding along the proportioning resistance I.

With any given adjustment or calibration of the instrument shown in part in Fig. 6, each rising or falling movement of the link E$^2$, produced by a corresponding increase or decrease in the controlling temperature, will produce a corresponding adjustment of the valve HC, and the latter will not be subject to a further adjustment as a result of the expansion or contraction of the bellows IC$^4$, except as such change in bellows length may eventually change the controlling temperature and thereby result in a further adjustment of the link E$^2$. While the adjustment of the thrust member MC permits of an adjustment in the control range of the instrument, in general, that control range at its maximum must be such that the contact NC will be moved from one end to the other of the resistance I, by a variation in the controlling temperature which is a fraction, only, of that required to produce a full scale deflection of the recording pen and full range up or down movement of the link E$^2$. By a manual adjustment of the instrument shown in Fig. 6, such as is obtainable by the adjustment of the previously mentioned control point adjustment device e$^2$, the instrument of Fig. 6 may be adapted for use with any normal value of the controlling temperature which the instrument is adapted to measure.

In Fig. 7, I have illustrated a modification of the instrument shown in Fig. 6, in which the expansion or contraction of the bellows ID$^4$, on a change in the control pressure, results in a corresponding bodily adjustment of the corresponding nozzle element ID', having the same effect on the relative position of that nozzle and the flapper valve HD, as results in the instrument shown in Fig. 1, from the adjustment of the lever G produced by the adjustment of the lever L. To this end, in Fig. 7, a yoke T is secured to the movable end of the bellows ID⁴, and is pivotally connected to an arm ID¹⁵. The latter forms a rigid support for the nozzle ID' and is pivotally connected to the instrument framework for turning movement relative to the latter about the axis of the flapper valve HD. The nozzle ID' is connected to the interior of the bellows ID⁴ by means including a flexible conduit ID¹⁶ which yields to permit a bodily movement of the nozzle ID' relative to the stationary end head ID² of the bellows ID⁴.

With the arrangement shown in Fig. 7, a movement of the valve HD toward the nozzle ID', and the resultant expansion of the relay bellows ID⁴, moves the nozzle ID' away from the valve so as to partially neutralize the effect of the initial movement of the valve toward the nozzle. Conversely, when the initial adjustment of the valve HD is away from the nozzle ID', the resultant change in the pressure in the bellows ID⁴ produces a movement of the nozzle toward the valve partially neutralizing the effect of the initial movement of the latter away from the nozzle. With the nozzle rigidly attached to the arm ID¹⁵, and the latter pivotally connected to the instrument framework coaxially with the valve HD, the bodily adjustments of the nozzle do not interfere with the normal relation of the valve approximately parallel to the end surface of the nozzle ID', against which the valve tends to seat. In Fig. 7, the control lever LD corresponding to the levers L, LA, and LC, previously mentioned, is connected to the yoke T by a pin and slot connection permitting the yoke to accommodate itself to the turning movement of the arm ID¹⁵, while angularly adjusting the lever LD as the bellows ID⁴ elongates and contracts.

In Fig. 8 I have illustrated a second modification of the apparatus shown in Fig. 6, in which the expansion or contraction of the relay bellows IE gives bodily movement to the nozzle element IE' relative to the flapper valve HE generally as is obtained with the arrangement shown in Fig. 7. In Fig. 8, the nozzle element IE' is of goose neck form so that its valve engaging end is at the opposite side of the flapper from the movable end IE⁵ of the bellows IE⁴. In Fig. 8, the control lever LE is connected to the movable end of the bellows IE⁴ in a manner analogous to that in which the lever LC is connected to the movable end of the bellows IC⁴ in Fig. 6. In the operation of the apparatus shown in Fig. 8, the bodily movement of the nozzle IE' varies the relation between the plane of the flapper engaged end surface of the nozzle IE', and the plane of the flapper valve HE, in a manner which is avoided with the arrangement such as that shown in Fig. 7, wherein the said relation is changed only as a result of the turning movement of the flapper valve about its pivotal axis.

Certain novel features of construction and arrangement invented by me and disclosed, but not claimed herein, are disclosed and claimed in my prior Patent No. 2,125,081.

In any instrument comprising a pneumatic power device or relay mechanism for adjusting some instrument device or mechanism in accordance with the movements of a sensitive movable measuring element, there are certain general advantages in placing a compressor, supplying air under pressure for the actuation of the power device or relay mechanism, in the instrument casing, so that the air compressed and used may be continuously held within the casing, and hence does not require filtering or give rise to difficulties as a result of the condensation of the water vapor with the air, or as a result of pressure drop and time lag due to the flow of the pressure air through elongated piping supplying air to the instrument from an external source of compressed air. The conception of an arrangement of the compressor within an instrument casing to obtain the general advantages just mentioned, did not originate with me, but with Roy Ullman, and is disclosed and claimed in his application, Serial No. 82,859, filed of even date herewith.

In combining an air compressor within the instrument casing, with control means of the proportioning type herein illustrated, I obtain special advantages, however, in respect to instrument compactness and simplification, and in respect to the simple and positive manner in which the control switch lever is given its movements, by means of a relatively small amount of air compressed only to a relatively moderate pressure.

While in accordance with the provisions of the statutes I have illustrated and described the best forms of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent, is:

1. A control instrument combination comprising, a member, means responsive to variations in a condition for deflecting said member in accordance with said variations, proportioning means including an electrical resistance and a contact, and a fluid pressure relay mechanism for adjusting said contact along said resistance, said mechanism comprising a pressure chamber and a part acting on said contact to adjust the latter in one direction or the other as the pressure in said chamber is increased and decreased, and means for varying said pressure in accordance with the deflective position of said member.

2. A control instrument combination comprising, a member, means responsive to variations in a condition for deflecting said member in accordance with said variations, proportioning means including an electrical resistance, and a contact, and a fluid pressure relay mechanism for adjusting said contact along said resistance in accordance with the deflection of said member, said mechanism comprising a fluid pressure chamber and a part acting on said contact to adjust the latter in one direction or the other as the pressure in said chamber is increased and decreased, a valve controlling said pressure, and valve operating means actuated by the deflection of said member and by the movement of said part.

3. A control instrument combination comprising, a member, means responsive to variations in a condition for deflecting said member in accordance with said variations, proportioning means including an electrical resistance and a contact, and a fluid pressure relay mechanism for adjusting said contact along said resistance in accordance with the deflection of said member, said mechanism comprising a pressure chamber, a support, a part acting on said contact and support to adjust each in one direction or the other as the pressure in said chamber is increased and decreased, a valve controlling said pressure, a valve operating lever mounted on said support, and an operating connection between said member and lever.

4. A control instrument combination comprising, a member, means responsive to variations in a condition for deflecting said member in accordance with said variations, proportioning means including an electrical resistance and a contact, and a fluid pressure relay mechanism for adjusting said contact along said resistance in accordance with the deflection of said member, said mechanism comprising a pressure chamber and a part moving in one direction or the other as the pressure in said chamber is increased and decreased, means for varying said pressure in accordance with the deflective position of said member, and an operating connection between said part and contact adjustable to vary the position of said contact for a given position of said part.

5. A control instrument combination comprising, a member, means responsive to variations in a condition for deflecting said member in accordance with said variations, proportioning means including an electrical resistance and a contact, and a fluid pressure relay mechanism for adjusting said contact along said resistance in accordance with the deflection of said member, said mechanism comprising a pressure chamber and a part moving in one direction or the other as the pressure in said chamber is increased and decreased, means for varying said pressure in accordance with the deflective position of said member, said last mentioned means being adjustable to vary the ratio between the deflective movement of said member and the variations in said pressure, and an operating connection between said part and contact.

6. A control instrument combination comprising, a member, means responsive to variations in a condition for deflecting said member in accordance with said variations, proportioning means including an electrical resistance and a contact, and a fluid pressure relay mechanism for adjusting said contact along said resistance in accordance with the deflection of said member, said mechanism comprising a pressure chamber and a part acting on said contact to adjust the latter in one direction or the other as the pressure in said chamber is increased and decreased, a valve controlling said pressure, a lever support adapted to be adjusted in accordance with the position of said part, a valve operating lever mounted on said support, and an operating connection between said member and lever.

7. A control instrument combination comprising, a member, means responsive to variations in a condition for deflecting said member in accordance with said variations, proportioning means including an electrical resistance and a contact, and a fluid pressure relay mechanism for adjusting said contact in accordance with the deflection of said member, said mechanism comprising a fluid pressure chamber, a part adjusting said contact in one direction or the other as the pressure in said chamber is increased and decreased, a valve controlling said pressure, and means actuated by a deflection of said member to effect a corresponding initial adjustment of said valve, and means actuated by the resultant movement of said part to effect a second valve adjustment partially neutralizing said initial adjustment.

8. A control instrument combination comprising, a member, means responsive to variations in a condition for deflecting said member in accordance with said variations, proportioning means including an electrical resistance and a contact, and a fluid pressure relay mechanism for adjusting said contact in accordance with the deflection of said member, said mechanism comprising a fluid pressure chamber, a part adjusting said contact in one direction or the other as the pressure in said chamber is increased and decreased, a valve controlling said pressure, means actuated by a deflection of said member to effect a corresponding initial adjustment of said valve, and means actuated by the resultant movement of said part to effect a second valve adjustment partially neutralizing said initial adjustment, and slow acting means for effecting a third valve adjustment in the same direction as said initial adjustment.

9. A control instrument combination comprising, a member, means responsive to variations in a condition for deflecting said member in accordance with said variations, proportioning means including an electrical resistance, a contact, an element adapted to turn about an axis and move said contact along said resistance, and a relay mechanism for adjusting the angular position of said element in accordance with the deflection of said member, said mechanism comprising a fluid pressure device including a pressure chamber and a part acting on said element to angularly adjust the latter in one direction or the other as the pressure in said chamber is increased and decreased, a valve controlling said pressure, and valve operating means subject to adjustment by said member and element, through which a deflection of said member produces a corresponding initial adjustment of said valve, and through which the resultant angular adjustment of said element effects a second adjustment of the valve opposite in direction to, and smaller in magnitude than said initial adjustment.

10. A control instrument combination comprising, a member, means responsive to variations in a condition for deflecting said member in accordance with said variations, proportioning means including an electrical resistance, a contact, an element adapted to turn about an axis and move said contact along said resistance, and a relay mechanism for adjusting the angular position of said element in accordance with the deflection of said member, said mechanism comprising a fluid pressure device including a pressure chamber and a part acting on said element to angularly adjust the latter in one direction or the other as the pressure in said chamber is increased and decreased, a valve controlling said pressure, and valve operating means subject to adjustment by said member and element, through which a deflection of said member produces a corresponding initial adjustment of said valve, and through which the resultant angular adjustment of said element effects a second adjustment of the valve opposite in direction to, and smaller in magnitude than said initial adjustment, and including means for varying the relative magnitude of said two valve adjustments.

11. A control instrument combination comprising, a member, means responsive to variations in a condition for deflecting said member in accordance with said variations, of a fluid pressure device having a pressure chamber and an actuating part moving in one direction or the other as the pressure in said chamber is increased and decreased, an adjustable valve adapted to increase or decrease said pressure on adjustment in one direction or the other, a valve adjusting lever, a fulcrum lever on which said adjusting lever is pivotally supported, an operative connection between said adjusting lever and member whereby a deflection of the latter adjusts said adjusting lever relative to said fulcrum lever and thereby effects an initial valve adjustment, an adjustable fulcrum support for said fulcrum lever, an operative connection between said fulcrum lever and movable part through which on a change in said pressure produced by said initial valve adjustment, said part adjusts said fulcrum lever to effect a second valve adjustment opposite in direction to said initial adjustment and means acting in slow response to said change in said pressure to adjust said support in the direction to effect a third valve adjustment in the same direction as said initial adjustment.

12. A control instrument combination comprising, a member, means responsive to variations in a condition for deflecting said member in accordance with said variations, proportioning means including an electrical resistance, a contact, and a pneumatic relay mechanism for adjusting the angular position of said contact in accordance with the deflection of said member, said mechanism comprising a fluid pressure device including a pressure chamber and a part acting on said contact to angularly adjust the latter in one direction or the other as the pressure in said chamber is increased and decreased, a valve controlling the discharge of air from said mechanism to the space in said casing and thereby controlling said pressure, valve operating means subject to adjustment by said member and said part, through which a deflection of said member produces a corresponding initial adjustment of said valve, and through which the adjustment of said part effects a second adjustment of the valve opposite in direction to, and smaller in magnitude than said initial adjustment, and an air compressor drawing air from said space, compressing said air and delivering the compressed air to said mechanism.

13. A control instrument combination comprising, a member, means responsive to variations in a condition for deflecting said member in accordance with said variations, means for controlling a control member comprising an electrical network including a coil and a cooperating element the relative positions of said coil and element varying the electrical network condition to adjust said control member, and a fluid pressure relay mechanism for adjusting said element in accordance with the deflection of said member, said mechanism comprising a fluid pressure chamber, a part adjusting said element in one direction or the other as the pressure in said chamber is increased and decreased, a valve controlling said pressure, means actuated by a deflection of said member to effect a corresponding initial adjustment of said valve, and means actuated by the resultant movement of said part to effect a second valve adjustment partially neutralizing said initial adjustment.

14. A control instrument combination comprising, a member, means responsive to variations in a condition for deflecting said member in accordance with said variations, means for controlling a control member comprising an electrical network including a coil and a cooperating element the relative positions of said coil and element varying the electrical network condition to adjust said control member, and a fluid pressure relay mechanism for adjusting said element in accordance with the deflection of said member, said mechanism comprising a fluid pressure chamber, a part adjusting said element in one direction or the other as the pressure in said chamber is increased and decreased, a valve controlling said pressure, means actuated by a deflection of said member to effect a corresponding initial adjustment of said valve, and means actuated by the resultant movement of said part to effect a second valve adjustment partially neutralizing said initial adjustment, and slow acting means for effecting a third valve adjustment in the same direction as said initial adjustment.

15. A control instrument combination comprising, a member, means responsive to variations in a condition for deflecting said member in accordance with said variations, means for controlling a control member comprising an electrical network including a coil and a cooperating element the relative positions of said coil and element varying the electrical network condition to adjust said control member, and a fluid pressure relay mechanism for adjusting said element in accordance with the deflection of said member, said mechanism comprising a fluid pressure chamber, a part adjusting said element in one direction or the other as the pressure in said chamber is increased and decreased, a valve controlling said pressure, means actuated by a deflection of said member to effect a corresponding initial adjustment of said valve, and means actuated by the resultant movement of said part to effect a second valve adjustment partially neutralizing said initial adjustment, and slow acting pressure responsive means influenced by a change in pressure in said chamber for effecting a third valve adjustment in the same direction as said initial adjustment.

16. A control instrument combination comprising, a member, means responsive to variations in a condition for deflecting said member in accordance with said variations, means for controlling a control member comprising an electrical network including a coil and a cooperating element the relative positions of said coil and element varying the electrical network condition to adjust said control member, and a fluid pressure relay mechanism for adjusting said element in accordance with the deflection of said member, said mechanism comprising a fluid pressure chamber, a part adjusting said element in one direction or the other as the pressure in said chamber is increased and decreased to thereby unbalance said electrical network, means responsive to a movement of said control member to rebalance said electrical network, a valve controlling said pressure, means actuated by a deflection of said member to effect a corresponding adjustment of said valve, whereby said electrical network is first unbalanced and then rebalanced in response to a movement of said control member, and slow acting means for again unbalancing said electrical network independently of the deflection of the first mentioned member.

17. A control instrument combination comprising, a member, means responsive to variations in a condition for deflecting said member in accordance with said variations, means for controlling a control member comprising an electrical network including a coil and a cooperating element the relative positions of said coil and element varying the electrical network condition to adjust said control member, and a fluid pressure relay mechanism for adjusting said element in accordance with the deflection of said member, said mechanism comprising a fluid pressure chamber, a part adjusting said element in one direction or the other as the pressure in said chamber is increased and decreased to thereby unbalance said electrical network, means responsive to a movement of said control member to rebalance said electrical network, a valve controlling said pressure, means actuated by a deflection of said member to effect a corresponding adjustment of said valve, whereby said electrical network is first unbalanced and then rebalanced in response to a movement of said control member, and slow acting means for again unbalancing said electrical network in the same direction as the original unbalance and independently of the deflection of the first mentioned member.

COLEMAN B. MOORE.